(12) United States Patent
Suzuki

(10) Patent No.: US 8,037,508 B2
(45) Date of Patent: Oct. 11, 2011

(54) VIDEO SERVER AND FILE MANAGEMENT METHOD

(75) Inventor: Toshio Suzuki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 350 days.

(21) Appl. No.: 12/408,872

(22) Filed: Mar. 23, 2009

(65) Prior Publication Data

US 2009/0254570 A1 Oct. 8, 2009

(30) Foreign Application Priority Data

Apr. 7, 2008 (JP) ................................. 2008-099726

(51) Int. Cl.
*H04N 7/173* (2006.01)
(52) U.S. Cl. ...................................................... 725/115
(58) Field of Classification Search .................. None
See application file for complete search history.

(56) References Cited

U.S. PATENT DOCUMENTS

| | | | | |
|---|---|---|---|---|
| 6,061,504 | A * | 5/2000 | Tzelnic et al. | 709/219 |
| 2003/0040962 | A1 * | 2/2003 | Lewis | 705/14 |
| 2007/0157253 | A1 * | 7/2007 | Ellis et al. | 725/61 |

OTHER PUBLICATIONS

Jason Nieh, et al., "The Design, Implementation and Evaluation of SMART: A Scheduler for Multimedia Applications", Operating Systems Review, ACM, vol. 31, No. 5, XP-000771031, Dec. 1, 1997, pp. 184-197.

T. Plagemann, et al., "Operating system support for multimedia systems", Computer Communications, vol. 23, No. 3, XP-004186945, Feb. 1, 2000, pp. 267-289.

Prashant J. Shenoy, et al., "Cello: A Disk Scheduling Framework for Next Generation Operating Systems", Proceedings of ACM International Conference on Measurement and Modeling of Computer Systems (Sigmetrics'98), XP-002541195, Jun. 1998, pp. 44-55.

David P. Anderson, "A File System for Continuous Media" ACM Transactions on Computer Systems, vol. 10, No. 4, XP-000336441, Nov. 1, 1992, pp. 311-337.

D. James Gemmell, et al., "Multimedia Storage Servers: A Tutorial", Computer, IEEE Service Center, vol. 28, No. 5, XP-000517832, May 1, 1995, pp. 40-49.

* cited by examiner

*Primary Examiner* — Brian Pendleton
*Assistant Examiner* — Cai Chen
(74) *Attorney, Agent, or Firm* — Oblon, Spivak, McClelland, Maier & Neustadt, L.L.P.

(57) ABSTRACT

A video server and a file management method which can erase an unnecessary program data file promptly are provided. Video server S divides processing of management of files performed by one frame into 11 sections, assigns five sections to playing process, assigns five sections to recording process and assigns one section to erasing process and performs processing of the file management. Server S supervises the file processing under executing. When a number of sections which perform the playing process or a number of sections which perform recording process is smaller than 5 and there is a demand of the erasing process for more than 2 files, server S assigns the section which is not used to the erasing process and unnecessary files are erased.

9 Claims, 6 Drawing Sheets

VIDEO SERVER AND FILE MANAGEMENT METHOD

CROSS REFERENCE TO RELATED APPLICATION

This application is based upon and claims the benefit of priority from the prior Japanese Patent Application No. 2008-099726, filed on Apr. 7, 2008, the entire contents of which are incorporated herein by reference.

FIELD OF THE INVENTION

The present invention relates to a video server which deals with program data used at a broadcasting station, and a file management method for the same.

DESCRIPTION OF THE BACKGROUND

At a broadcasting station, a magnetic tape, a magneto-optical disc, etc. have been conventionally used to store program data. However, since storing large volume data and rapid accessing became possible by a HDD (Hard Disk Drive) or a semiconductor memory, such as a SSD (Solid State Disk), in recent years, a video server which stores the program data in those storage devices has been introduced.

In the video server, since a plurality of program data are stored in a large amount of storage device unlike the magnetic tape, file management of program data is required. Even if the large capacity storage device is used, it is important to erase a file of the unnecessary program data promptly to reserve recordable capacity greatly so that the video server can record new program data at any time.

In order to manage recordable capacity, it is proposed a technique which discovers and erases the oldest file recorded on a storage device when a program data file is recorded to exceed a predetermined capacity (for example, JP, PH08-115333A).

However, in the conventional video server, even when performing multitask operation, priority is given to recording and playing. Since erasing is processed with the lowest priority and the files are erased one by one, there is a problem that erasing is not performed promptly.

SUMMARY OF THE INVENTION

Consequently, a purpose of the present invention is to provide a video server which can erase an unnecessary program data file promptly and a file management method for the same.

In accordance with the invention, a video server can play or record each of a plurality of coded program data independently and simultaneously. The video server includes a memory, a control unit and a control unit. The memory is configured to record or store the coded program data with identification information thereof. The control input unit is configured to be inputted a command concerning any file processing of play file processing, record file processing, or erasing file processing and the identification information. The control unit is configured to divide a predetermined one frame time equally into a predetermined number to setup a plurality of sections, assign the play file processing to said section within a predetermined maximum number of sections which can be assigned to playing process according to the command corresponding to the play file processing and the identification information inputted to the control input unit, assign the record file processing to the section a predetermined maximum number of sections which can be assigned to recording process according to the command corresponding to the record file processing and the identification information inputted to said control input unit, and assign the erasing file processing to at least one the section according to the command corresponding to the erasing file processing and the identification information inputted to the control input unit. And the control unit is further configured to, when a number of sections assigned to the play file processing is smaller than said maximum number of sections which can be assigned to playing process, or a number of sections assigned to the record file processing is smaller than said maximum number of sections which can be assigned to recording process, assign the erasing file processing to the section which is not assigned to said play file processing and the record file processing.

Furthermore a file management method of the video server of the present invention includes a memory, control input unit and a control unit, and can play or record each of a plurality of coded program data independently and simultaneously. The file management method includes being inputted a command concerning anyone of file processing of play file processing, record file processing and erasing file processing and an identification information of said program data, dividing a predetermined one frame time equally into a predetermined number to set up a plurality of sections, setting up a maximum number of sections which can be assigned to playing process as for play file processing, setting up a maximum number of sections which can be assigned to recording process as for record file processing, assigning the section within the maximum number of sections which can be assigned to playing process to inputted the play file processing, assigning the section within the maximum number of sections which can be assigned to recording process to inputted the record file processing, assigning at least one section to inputted the erasing file processing, and assign the erasing file processing to the section which is not assigned to the play file processing and the record file processing when there are a plurality of the erasing file processing inputted, a number of said sections currently used by the play file processing is smaller than the maximum number of sections which can be assigned to playing process, or a number of the sections currently used by the record file processing is smaller than the maximum number of sections which can be assigned to recording process.

DETAILED DESCRIPTION OF THE INVENTION

Hereinafter, the embodiment of this invention will be explained with reference to accompanying drawings.

Figure 1:
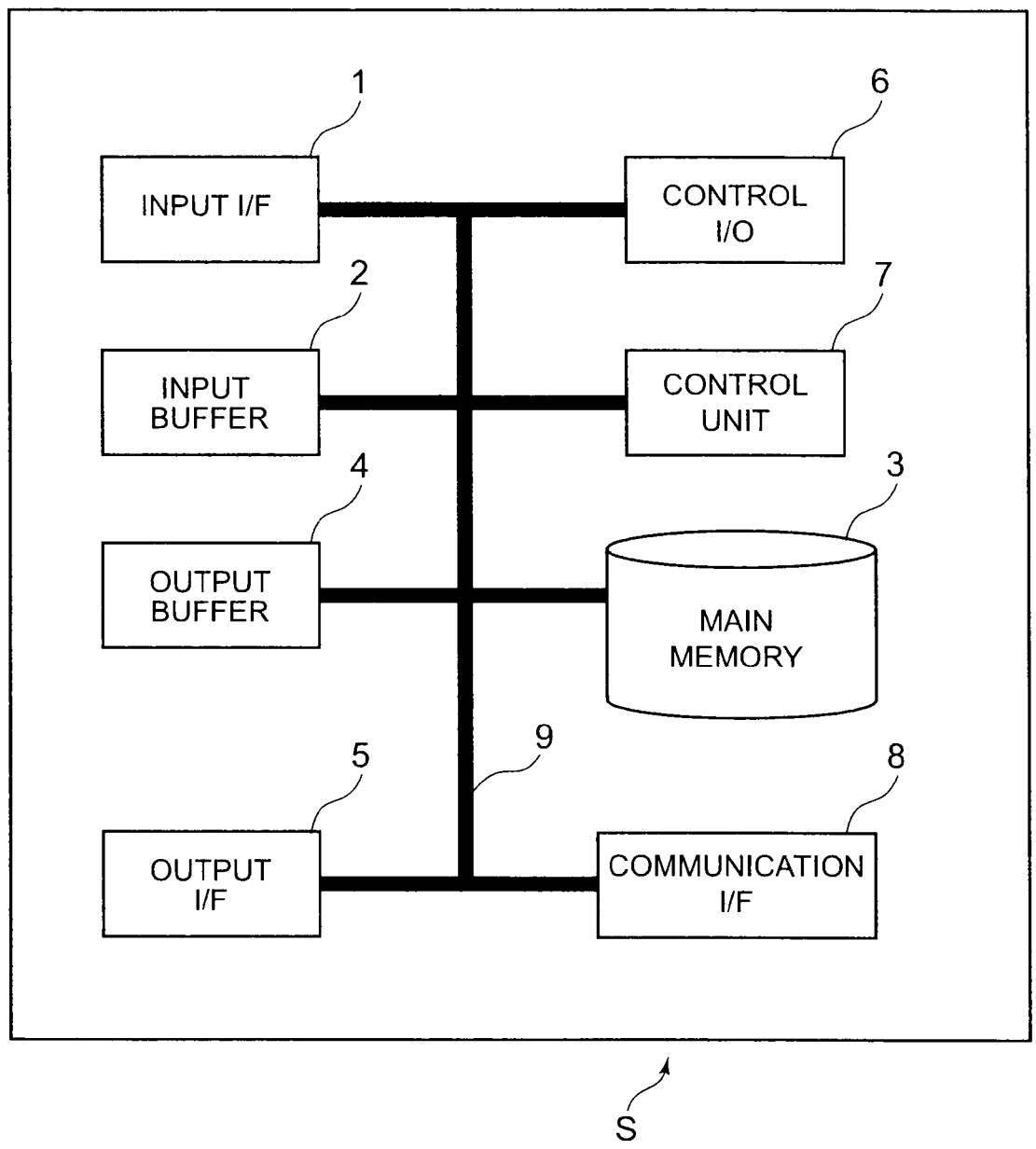
FIG. 1 is a functional block diagram explaining a video server concerning an embodiment.

FIG. 1 is a functional block diagram explaining functional operation of the video server concerning the embodiment of the present invention.

Video server S is provided with input interface (I/F) 1, input buffer 2, main memory 3, output buffer 4, output interface (I/F) 5, control input output unit (I/O) 6, communication interface (I/F) 8, control unit 7, and internal bus 9 which connects these.

Input I/F 1 is an interface which converts an encoded video signal (hereafter, it is called a TS signal: Transport Stream signal.) inputted into video server S into data to be transferred to main memory 3 via internal bus 9. Output I/F 5 is an interface which converts the data into the TS signal and outputs it on the contrary. These both interfaces may include a communication interface which inputs or outputs the TS signal.

Furthermore, input I/F 1 may also include an encoding means, and output I/F 5 may also include a decoding means, if required. In this case, an non-encoded video signal can be inputted into video server S, and can be outputted from video server S.

Main memory 3 is a high-capacity HDD or a high-capacity storage device which comprises a semiconductor memory, for example, a flash memory. On main memory 3, a data file corresponding to the TS signal is recorded, played or erased. When the data file is recorded on main memory 3, the data file is divided and recorded on some sectors or memory blocks of main memory 3. Input buffer 2 stores temporarily the data file to be inputted into main memory 3 from input I/F 1. Output buffer 4 stores temporarily the data file to be outputted to output I/F 5 from main memory 3.

A keyboard, a mouse, and a display (not shown) are connected to control I/O 6. A command, identification information of the data file corresponding to program data, control data, etc. are inputted from the keyboard and the mouse, and various messages are outputted and displayed on the display. In the case of file processing, the command and the identification information of the data file following the command are inputted. For example, when recording the TS signal on main memory 3 as the data file "ABCD#1", the command "REC:" and the identification information "ABCD#1" of the data file following the command are inputted via control I/O 6. That is, "REC:ABCD#1" is inputted.

Communication I/F 8 outputs or inputs the control data for video server S, the above-mentioned command, the identification information of the data file, etc. via a control network (not shown) in the outside of video server S. Therefore, control I/O 6 and communication I/F 8 function as a control input unit.

Control unit 7 contains a CPU (Central Processing Unit), and supervises and controls each component in video server S via internal bus 9. Control unit 7 reads the above-mentioned command and the identification information of the data file, and performs file processing of recording, playing or erasing about the data file to main memory 3.

Multi task operation is performed inside video server S. In the multi task (multi channel recording/playing) operation, when video server S is seen from the outside, a plurality of file processing for a plurality of data files seem to be performed simultaneously. In this embodiment, the multi channel record and play processing includes recording, playing and erasing.

Video server S records, plays or erases the data file corresponding to the TS signal of the program data specified by the command and the identification information of the data file which were inputted into control I/O 6 by an operator. The priority is given to such file processing. In order to send out the program data to broadcast without trouble, the highest priority is given to playing the file. Middle priority is given to recording the program data to be broadcasted, and the lowest priority is given to erasing an unnecessary file.

Figure 2A:
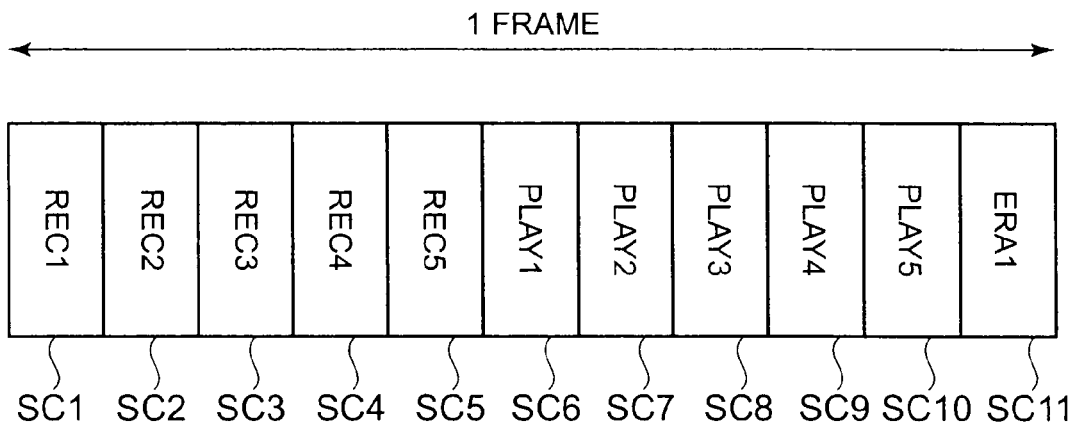
FIG. 2A is a drawing explaining time allocation in which the video server concerning the embodiment manages files corresponds to each section(s) by multitask operation.

FIG. 2A to FIG. 2D are schematic diagrams of time allocation (processing sequence) for managing the files by the multitask operation. As shown in FIG. 2A, a predetermined time, for example, a time corresponding to one-frame of a video signal of the program data is set as one frame of the multitask operation, and this one frame is divided into a predetermined number of channel/section equally. It is divided equally into, for example, 11 sections of section SC1 to section SC11. One file process can be assigned to one section and 11 file processes can be simultaneously performed in 1 frame.

Control unit 7 assigns 5 as a maximum number of sections which can be assigned to playing process. And control unit 7 assigns 5 as a maximum number of sections which can be assigned to recording process. Furthermore, control unit 7 assigns one section for erasing process. That is, playing of five files, recording of five files, and erasing of one file can be processed simultaneously at a maximum. And, for example, sections SC1 to SC5 are assigned for record and sections SC6 to SC10 are assigned for play and section SC11 is assigned for erasing. FIG. 2A shows a state that section SC1 for record to section SC5 for record are assigned to recording process REC1 to recording process REC5, section SC6 for play to section SC10 for play are assigned to playing process PLAY1 to playing process PLAY5, and section 11 for erasing is assigned to erasing process ERA1 simultaneously.

The maximum number of sections which can be assigned to playing process, and the maximum number of sections which can be assigned to recording process are not restricted to 5 and 5, respectively. These can be distributed and set as arbitrary numbers smaller than the number which divided one frame equally, for example within the limit of 10, if required.

If main memory 3 comprises the flash memory of the semiconductor, various processes can be performed simultaneously by managing a memory area by a plurality of blocks. If main memory 3 is the HDD, various processing can be performed simultaneously by sector management of the storage medium.

Next, the state where three files are played, two files are recorded and one file is erased simultaneously is considered. This state corresponds to the following case. For example, the program data that includes 3 files of video and sound, a caption and data is played and broadcasted, and two program data are stored in preparation for next broadcast during this broadcast. And an unnecessary file is erased in order to increase free space of main memory 3.

Figure 2B:
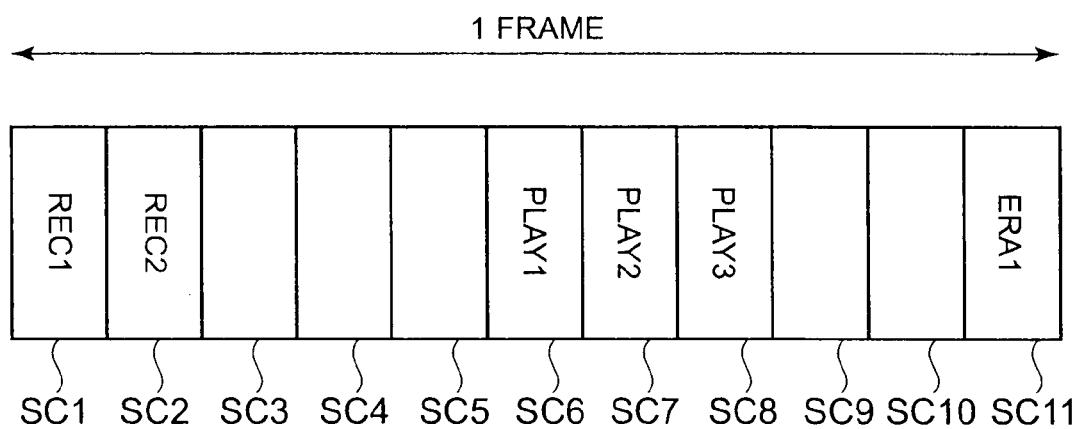
FIG. 2B is a drawing explaining the time allocation in which the video server concerning the embodiment manages the files corresponds to each section(s) by multitask operation.

FIG. 2B describes this example. Sections SC1 and SC2 for record are used for recording processes REC1 and REC2, and sections SC6, SC7 and SC8 for play are used for playing processes PLAY1, PLAY2 and PLAY3, and section SC11 for erasing is used for erasing process ERA1. If volume of the files recorded becomes large, the free space of main memory 3 runs short. It is necessary to erase the file which became unnecessary as promptly as possible to give a margin to the free space.

In a large capacity of semiconductor memory particularly using the flash memory, even when overwriting, it is necessary to erase the data currently recorded in advance of record. And even if the HDD is used, in order not to send out stored data of garbage which is not overwritten, it is required the erasing process which initializes a field which had memorized the erased data into the state where no data is written.

In the example shown in FIG. 2B, since five sections SC3, SC4, SC5, SC9 and SC10 are blank, useless open time when no processing is performed has arisen in one-frame processing time. According to this embodiment, the margin is given to the free space of main memory 3 by assigning such open time (section) to the erasing process and finishing the erasing of the unnecessary file quickly.

Then, control unit 7 counts a number of files with which the playing process and the recording process were specified. Control unit 7 compares the number of play files counted and the maximum number of sections which can be assigned to playing process, and compares the number of record files counted and the maximum number of sections which can be assigned to recording process. And control unit 7 computes a number of sections which can be assigned to the erasing process. The erasing process of the file with which the erasing process was specified is assigned to the blank section(s), and a plurality of files are erased simultaneously. Thereby, the free space of main memory 3 can be expanded without affecting the playing process and the recording process under processing.

Figure 2C:
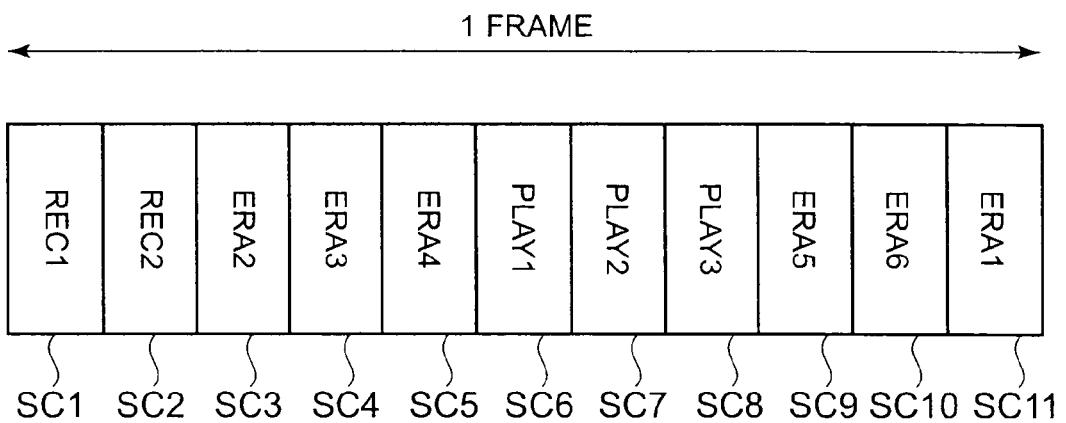
FIG. 2C is a drawing explaining the time allocation in which the video server concerning the embodiment manages the files corresponds to each section(s) by multitask operation.

That is, for example, blank five sections SC3, SC4, SC5, SC9 and SC10 in FIG. 2B can be assigned to the erasing processes ERA2, ERA3, ERA4, ERA5 and ERA6 as shown in FIG. 2C.

When assigning the erasing process to the blank section, it is desirable to assign the erasing process in order from the section for record with the low priority compared to the section for play. For example, as for the erasing process assigned to the section for record, when returning the section to the original recording process, the playing process is not affected even if restoration processing takes time.

Figure 3A:
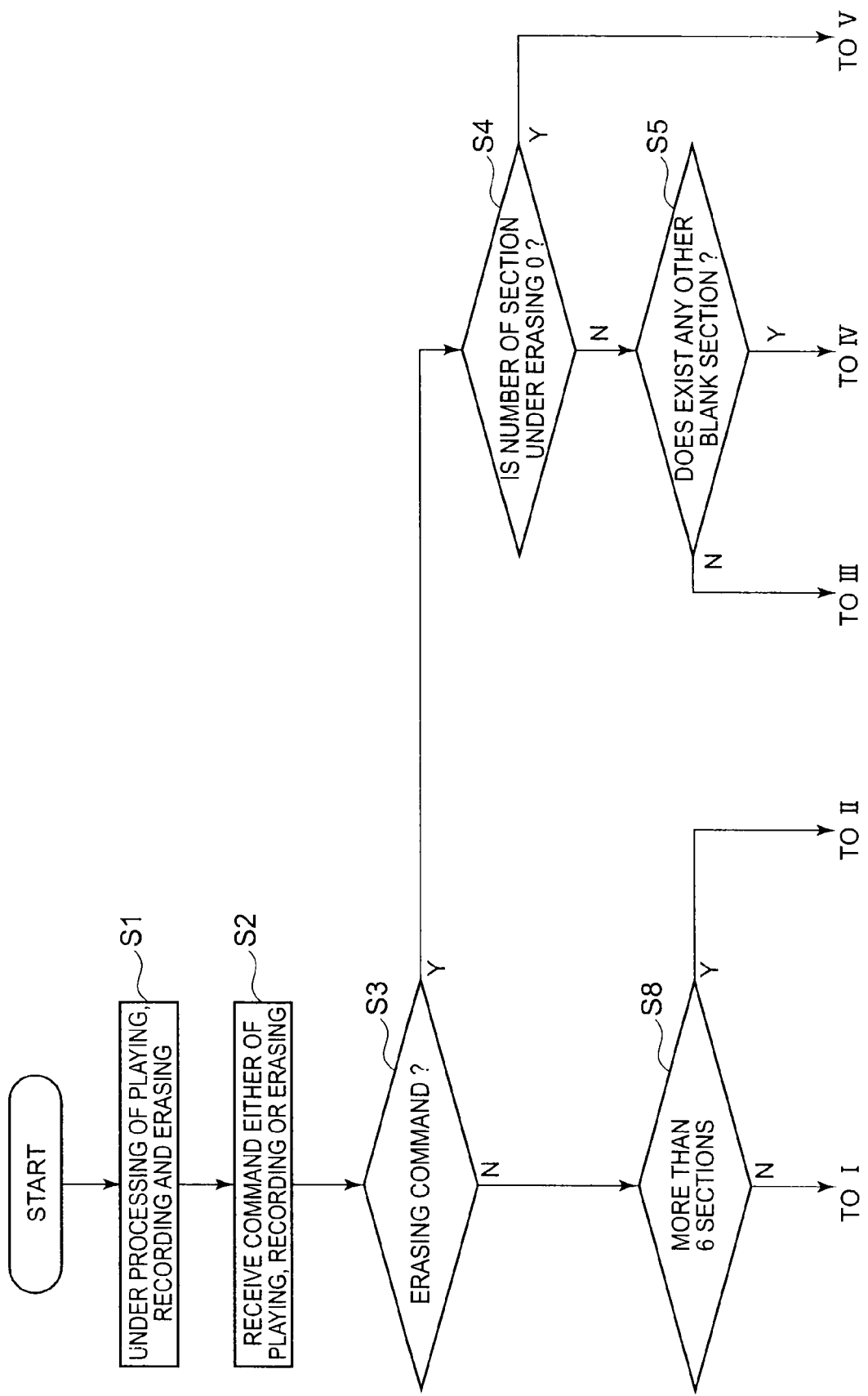
FIG. 3A is a flow chart explaining operation of the video server concerning the embodiment.
Figure 3B:
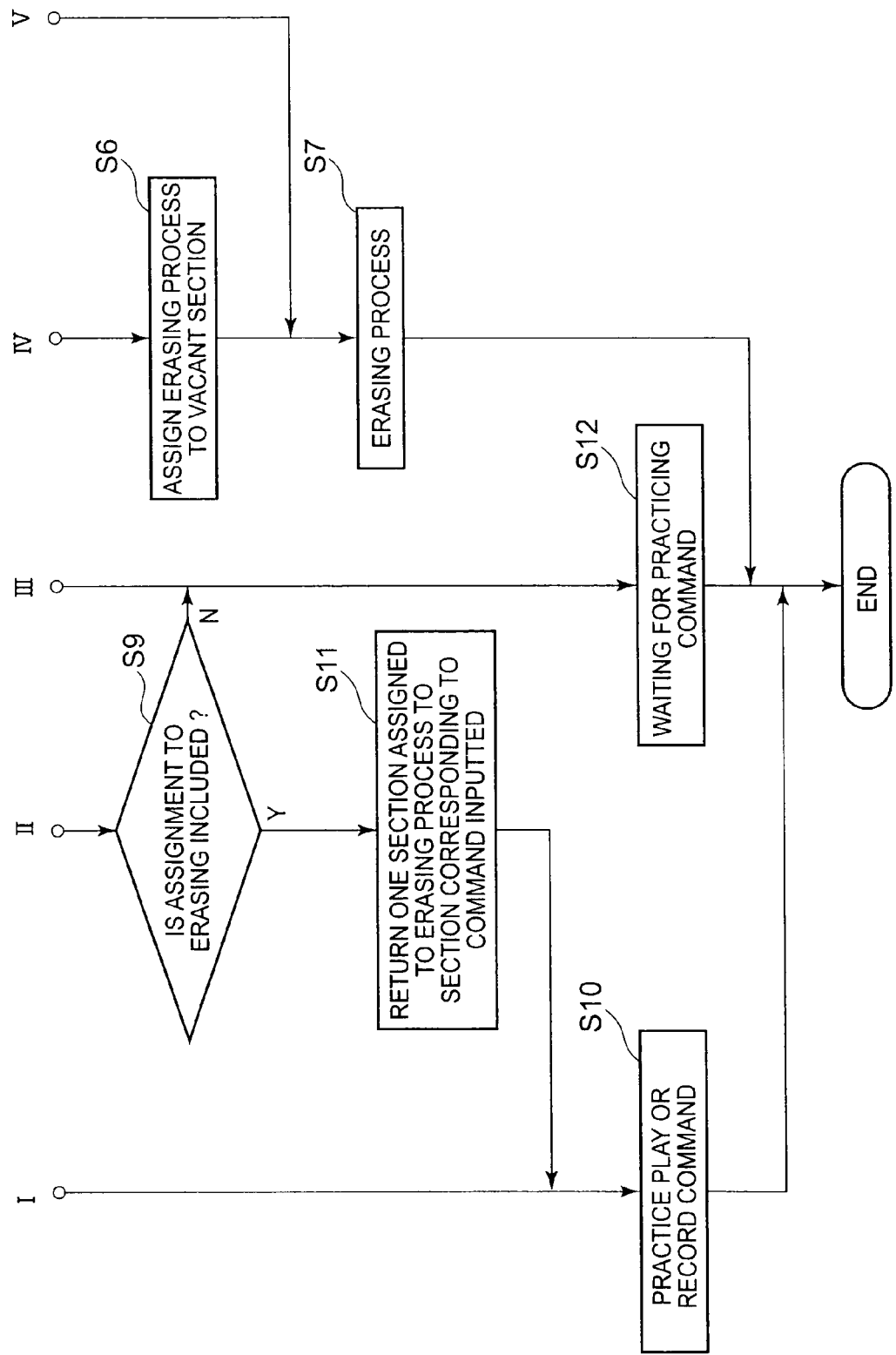
FIG. 3B is a flow chart explaining operation of the video server concerning the embodiment.
Figure 4:
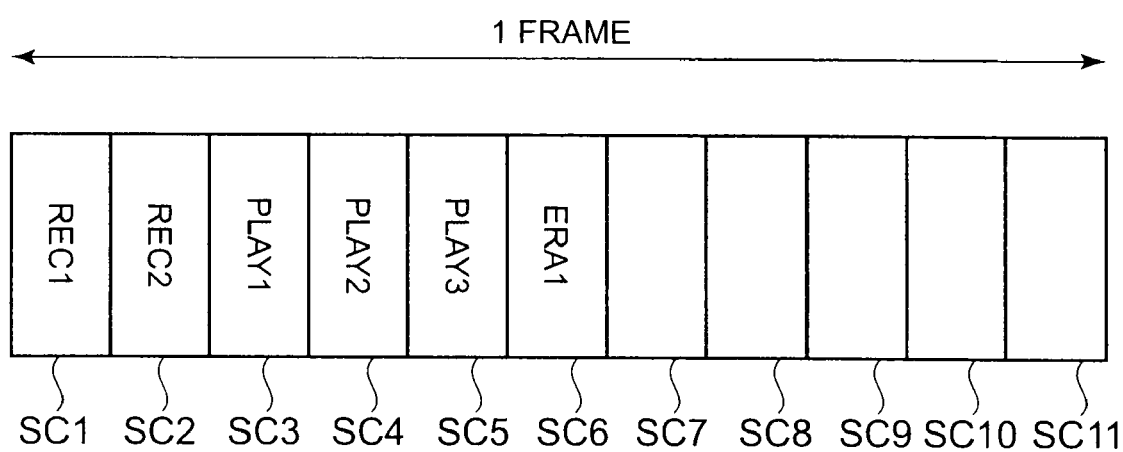
FIG. 4 is a drawing explaining time allocation in which a video server concerning another embodiment manages files corresponds to each section(s) by multitask operation.

FIGS. 3A and 3B are flow charts explaining operation of the video server of the above-mentioned embodiment. Hereinafter, the operation of the video server is explained with reference to FIGS. 3A and 3B.

Here, in video server S, the files of the program data, for example, respective identification information "ABCD1000", "ABCD1002", "ABCD1003", "EFGH2005", "BCDE3001", "BCDE3002", "BCDE3003", "BCDE3004" . . . "BCDE300n" . . . are recorded and stored.

The command which plays three files "ABCD1000", "ABCD1002" and "ABCD1003" and the identification information of the files are inputted into control I/O 6, and these files are being played from main memory 3 and are sending out from output interface 5 (step S1). In step S1, by the command which records two files "EFGH2000" and "EFGH2003", these files are inputted from input I/F 1 and are being recorded on main memory 3. Furthermore, an unnecessary file "BCDE3001" is being erased from main memory 3. This state corresponds to a distribution of the sections shown in FIG. 2B.

Nevertheless the command and the identification information of the file are inputted into control I/O 6 by operator's keyboard operation, communication I/F 8 may receive them from the outside via the network.

In this state, the command of recording, playing or erasing either and the identification information of the file are newly received (step S2). For example, the command which includes "ERA:BCDE3002" is received. Control unit 7 checks whether the command is a erasing command (step S3). "ERA:BCDE3002" is the erasing command (step S3 is Yes), and it is also checked whether the section under deleting exists (step S4).

Figure 2D:
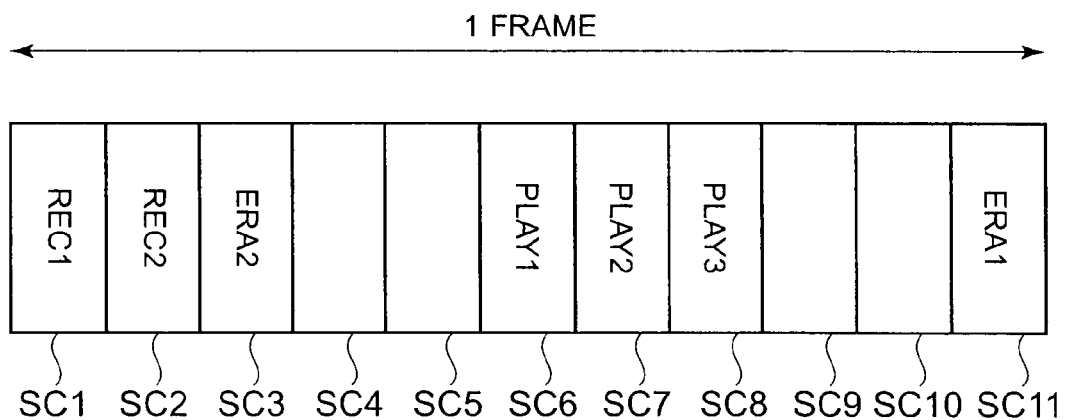
FIG. 2D is a drawing explaining the time allocation in which the video server concerning the embodiment manages the files correspond to each section(s) by multitask operation.

Since "BCDE3001" is under erasing at section SC11 for erasing (step S4 is No), it is checked whether any other blank section exists (step S5). Here, sections SC3, SC4 and SC5 for record and sections SC9 and SC10 for play do not perform the task. That is, since there are other blank sections (step S5 is Yes.), one of the blank sections can be assigned to the erasing process. When the blank sections exist in both the section for record and the section for play, the erasing process (ERA2) is assigned to section SC3 for record (step S6) as shown in FIG. 2D. That is, the erasing process is assigned to the section for record with the low priority among both. Thereby, the erasing process of "BCDE3002" is performed (step S7).

When there is no blank section in step S5 (step S5 is No), execution of the erasing process is made to stand by (step S12).

A waiting of the erasing process performs a process that memorizes the block position information of the file data on main memory 3 and holds the identification information and the block position information of the file to be erased on a work memory (not shown) in inputted order, etc.

When there is no section under erasing and section SC11 for erasing is blank as if "BCDE3001" is erased for the first time (step S4 is Yes), the erasing process "ERA1" of "BCDE3001" is assigned to section SC11 for erasing.

When the command inputted in step S3 is not the erasing command (step S3 is No.) (when the command is the record command or the play command.), it is checked whether the inputted command can be executed in step S8. That is, it is checked whether the number of sections becomes six or more exceeding the maximum number of sections which can be assigned (step S8) when a new process is performed.

When the number of sections is six or more (step S8 is Yes), it is checked whether the erasing process is included in the sections originally assigned to its process (step S9). Since the command cannot be executed when erasing process is not included (step S9 is No), execution is waited until processing of other section of its process is completed and a blank section arises (step S12).

For example, if it is a waiting of the recording process, an input from input I/F 1 will be suspended, an inputted record data will be saved at input buffer 2 temporarily and will not be recorded to main memory 3.

In step S9, when the section currently assigned to the erasing process is included (step S9 is Yes), for example, as shown in FIG. 2C, section SC5 for record currently assigned to the erasing process as erasing process "ERA4" is returned to the original recording process (step S11). And the record command is executed (step S10).

In step S8, also when the number of sections is five or less (step S8 is No), the play command or the record command is executed (step S10).

In the embodiment shown in FIGS. 3A and 3B, in order to check whether the new record command or the new play command is practicable, it was checked at step S8 whether the number of the sections becomes six or more exceeding the maximum number of sections which can be assigned when the new process will be practiced. Other embodiment which checks whether the new record command or the new play command is practicable is described below.

In the embodiment shown in FIGS. 3A and 3B, sections SC1 . . . SC5 are assigned for record and sections SC6 . . . SC10 are assigned for play. For this reason, in replacing step S8 of FIG. 3A, it is checked whether a blank section exists in sections SC1 . . . SC5 for record when the new recording process is performed, for example. When there is a blank section, the new recording process is assigned to the blank section and the record command is practiced at step S10.

When there is no blank section, it is checked whether there is any section for record currently assigned to the erasing process at step S9 of FIG. 3B. Other steps may be the same as the steps shown FIGS. 3A and 3B. This is also the same as when the new playing process is performed.

In the embodiment described using FIG. 2A-FIG. 2D, sections SC1 . . . SC5 are the sections for record, sections SC6. SC10 are the sections for play, and section SC11 is the section for erasing, and the section which performs the recording process or the playing process is fixedly assigned. However, it is not necessary to assign each section to the playing process, the recording process, and the erasing process fixedly. Without deciding application of each section beforehand, when the play command, the record command and the erasing command are executed according to the flow chart of FIGS. 3A and 3B, each process may be assigned to each section in order. The section in which the process ended becomes blank and will be assigned a next process. Of course also in this case, the playing process is assigned within the maximum number of sections which can be assigned to the playing process and the recording process is assigned within the maximum number of sections which can be assigned to the recording process, respectively.

As explained above, in the video server and the file management method of the present invention, the priority is given to the playing process and the recording process compared with the erasing process. And the erasing process will be assigned to the blank section (time) and performed if the playing process or the recording process has a margin. Thereby, many time to use for the erasing process of main memory 3 can be taken. Consequently, the video server and the file management method which can erase the unnecessary program data file promptly to reserve the free space of main memory 3 are provided. When particularly main memory 3 uses the flash memory, the effect that the unnecessary program data file can be erased promptly is large.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A video server which can play or record each of a plurality of coded program data independently and simultaneously, the video server, comprising:
   a memory configured to store said coded program data with identification information thereof;
   a control input unit configured to be inputted a command concerning any file processing of play file processing, record file processing, or erasing file processing and said identification information; and
   a control unit configured to
      divide a predetermined one frame time equally into a predetermined number to set up a plurality of sections,
      assign said play file processing to said section within a predetermined maximum number of sections which can be assigned to playing process according to said command corresponding to said play file processing and said identification information inputted to said control input unit,
      assign said record file processing to said section a predetermined maximum number of sections which can be assigned to recording process according to said command corresponding to said record file processing and said identification information inputted to said control input unit, and
      assign said erasing file processing to at least one said section according to said command corresponding to said erasing file processing and said identification information inputted to said control input unit;
   wherein said control unit is configured to, when a number of sections assigned to said play file processing is smaller than said maximum number of sections which can be assigned to playing process, or a number of sections assigned to said record file processing is smaller than said maximum number of sections which can be assigned to recording process, assign said erasing file processing to said section which is not assigned to said play file processing and said record file processing.

2. The video server according to claim 1, wherein
   when said number of sections assigned to said play file processing is the same as said maximum number of sections which can be assigned to playing process, and said number of sections assigned to said record file processing is the same as said maximum number of sections which can be assigned to recording process, other said erasing file processing is recorded on a work memory,
   when at least one file processing of said play file processing, said record file processing or said erasing file processing is completed and a blank section arises, recall said other erasing file processing from said work memory to assign said other file processing to said blank section.

3. A video server which can play or record each of a plurality of coded program data independently and simultaneously, the video server, comprising:
   a memory configured to store said coded program data with the identification information thereof;
   a control input unit configured to be inputted a command concerning any file processing of play file processing, record file processing, or erasing file processing and said identification information are inputted; and
   a control unit configured to
      divide a predetermined one frame time equally into a predetermined number to set up a plurality of sections,
      set up sections of predetermined maximum number of sections which can be assigned to recording process as the section for record, set up sections of predetermined maximum number of sections which can be assigned to playing process as the section for play, and set up one section as the section for erasing among said plurality of sections,
      furthermore assign said play file processing to said section for play according to said command corresponding to said play file processing and said identification information inputted to said control input unit;
      assign said record file processing to said section for record according to said command corresponding to said record file processing and said identification information inputted to said control input unit; and
      assign said erasing file processing to said section for erasing according to said command corresponding to said erasing file processing and said identification information inputted to said control input unit;
   wherein said control unit is configured to, when a blank section which is not assigned to any said file processing exists in said section for record and said section for play and two or more said commands for erasing file processing are inputted into said control input part, assign a part of erasing file processing to said blank section.

4. The video server according to claim 1 or 3, wherein said memory is a storage device which comprised a flash memory.

5. The video server according to claim 1 or 3, wherein said one frame time is a time corresponding to one-frame of a video signal of said program data.

6. The video server according to claim 1 or 3, wherein the sum of said predetermined maximum number of sections which can be assigned to playing process and said predetermined maximum number of sections which can be assigned to recording process is smaller than said predetermined number which divides said one frame time equally.

7. A file management method of a video server which includes a memory, control input unit and a control unit, and can play or record each of a plurality of coded program data independently and simultaneously, the file management method, comprising:
   being inputted a command concerning anyone of file processing of play file processing, record file processing and erasing file processing and an identification information of said program data;
   dividing a predetermined one frame time equally into a predetermined number to set up a plurality of sections;
   setting up a maximum number of sections which can be assigned to playing process as for play file processing;
   setting up a maximum number of sections which can be assigned to recording process as for record file processing;
   assigning said section within said maximum number of sections which can be assigned to playing process to inputted said play file processing;
   assigning said section within said maximum number of sections which can be assigned to recording process to inputted said record file processing;
   assigning at least one section to inputted said erasing file processing; and
   assign said erasing file processing to said section which is not assigned to said play file processing and said record file processing when there are a plurality of said erasing file processing inputted, a number of said sections currently used by said play file processing is smaller than said maximum number of sections which can be assigned to playing process, or a number of said sections currently used by said record file processing is smaller than said maximum number of sections which can be assigned to recording process.

8. The file management method according to claim 7, wherein said one frame time is a time corresponding to one-frame of a video signal of said program data.

9. A file management method of a video server which includes a memory, control input unit and a control unit, and can play or record each of a plurality of coded program data independently and simultaneously, the file management method, comprising:
   being inputted a command concerning any file processing of play file processing, record file processing, or erasing file processing and said identification information of said program data;
   dividing a predetermined one frame time equally into a predetermined number to set up a plurality of sections;
   assigning said section of a predetermined maximum number of sections which can be assigned to playing process as a section for play;
   assigning said section of a predetermined maximum number of sections which can be assigned to recording process as a section for record;
   assigning one said section as a section for erasing;
   assigning inputted said play file processing to said section for play;
   assigning inputted said record file processing to said section for record;
   assigning inputted said erasing file processing to said erasing section; and
   assigning at least one said erasing file processing to a blank section when there is said blank section which is not assigned to any of said file processing among said section for play and said section for record and there are two or more said erasing file processing inputted.

\* \* \* \* \*